(12) United States Patent
Jiang et al.

(10) Patent No.: US 8,645,304 B2
(45) Date of Patent: Feb. 4, 2014

(54) CHANGE POINT DETECTION IN CAUSAL MODELING

(75) Inventors: Huijing Jiang, White Plains, NY (US); Fei Liu, Scarsdale, NY (US); Aurelie C. Lozano, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 13/213,273

(22) Filed: Aug. 19, 2011

(65) Prior Publication Data

US 2013/0046721 A1 Feb. 21, 2013

(51) Int. Cl.
*G06N 5/02* (2006.01)
(52) U.S. Cl.
USPC .......................................................... 706/47
(58) Field of Classification Search
None
See application file for complete search history.

(56) References Cited

U.S. PATENT DOCUMENTS

| | | | |
|---|---|---|---|
| 2008/0010232 A1* | 1/2008 | Kant et al. | 706/52 |
| 2010/0046799 A1* | 2/2010 | Saptharishi et al. | 382/103 |
| 2011/0028827 A1* | 2/2011 | Sitaram et al. | 600/410 |
| 2011/0112998 A1* | 5/2011 | Abe et al. | 706/13 |
| 2011/0167031 A1* | 7/2011 | Kleinberg et al. | 706/52 |
| 2012/0143796 A1* | 6/2012 | Lozano et al. | 706/12 |
| 2013/0013535 A1* | 1/2013 | Punera et al. | 706/12 |
| 2013/0034277 A1* | 2/2013 | Cecchi et al. | 382/128 |

OTHER PUBLICATIONS

Jiang H. et al., "A Bayesian Markov-switching Model for Sparse Dynamic Network Estimation", SIAM International Conference on Data Mining, 2012, pp. 506-515.*
Adams R. et al., "Bayesian Online Changepoint Detection", arXiv:0710.3742, 2007.*
Lozano A. et al., "Grouped Graphical Granger Modeling Methods for Temporal Causal Modeling", KDD'09, Jun. 28-Jul. 1, 2009, Paris, France, pp. 577-585.*
Song L. et al., "Time-Varying Dynamic Bayesian Networks", Advances in Neural Information Processing Systems, 22, 2009, 1732-1740.*
Xuan X. et al., "Modeling Changing Dependency Structure in Multivariate Time Series", Proceedings of the 24 th International Conference on Machine Learning, Corvallis, OR, 2007, pp. 1055-1062.*
Alley, R., et al., "Climate Change 2007: The Physical Science Basis, Summary for Policymakers", Intergovernmental Panel on Climate Change, Feb. 2007, pp. 1-21.
Arnold, A., et al., "Temporal Causal Modeling with Graphical Granger Methods", KDD Proceedings of the 13th ACM SIGKDD international conference on Knowledge discovery and data mining, Aug. 2007, pp. 66-75.
Baum, L. E., et al., "A Maximization Technique Occurring in the Statistical Analysis of Probabilistic Functions of Markov Chains", The Annals of Mathematical Statistics, Feb. 1970, vol. 41, No. 1, pp. 164-171.

(Continued)

*Primary Examiner* — Jeffrey A Gaffin
*Assistant Examiner* — Dave Misir
(74) *Attorney, Agent, or Firm* — Scully, Scott, Murphy & Presser, P.C.; Daniel P. Morris, Esq.

(57) ABSTRACT

Structural changes in causal relationship over time may be detected, for example, by a Markov switching vector autoregressive model that detects and infers the structural changes in the causal graphs.

25 Claims, 4 Drawing Sheets

(56) References Cited

OTHER PUBLICATIONS

Booth, N. B., et al., "A Bayesian Approach to Retrospective Identification of Change-Points", Journal of Econometrics, May 1982, vol. 19, pp. 7-22.

Carlin, B. P., et al., "Hierarchical Bayesian Analysis of Changepoint Problems", Royal Statistical Society, 1992, vol. 41, No. 2, pp. 389-405.

Chernoff, H., et al., "Estimating the Current Mean of a Normal Distribution which is Subjected to Changes in Time", Institute of Mathematical Statistics, Sep. 1964, vol. 35, No. 3, pp. 999-1018.

Chib, S., et al., "Estimation and comparison of multiple change-point models", Journal of Econometrics, 1998, vol. 86, pp. 221-241.

Enders, W., et al., "Applied Econometric Time Series", Wiley, Jul. 2003.

Granger, C.W.J., "Testing for Casuality", Journal of Economic Dynamics and Control 2, May 1980, vol. 2, pp. 329-352.

Guyon, I., et al., "The Causality Workbench Virtual Lab", U.S. National Science Foundation, 2009.

Jarrett, R. G., "A Note on the Intervals Between Coal-Mining Disasters", Biometrika Trust, Apr. 1979, vol. 66, No. 1, pp. 191-193.

Lean, J., "Cycles and trends in solar irradiance and climate", John Wiley & Sons, Jan./Feb. 2010, vol. 1, pp. 111-122.

Lee, A., et al., "A Hierarchical Bayesian Framework for Constructing Sparsity-inducing Priors", ArXiv:1009.1914, Sep. 2010, pp. 1-18.

Lozano, A., et al., "Spatial-temporal Causal Modeling for Climate Change Attribution", KDD'09, Jun./Jul. 2009, vol. C, pp. 587-596.

Lozano, A., et al., "Grouped graphical Granger modeling for gene expression regulatory networks discovery", Bioinformatics, May 2009, vol. 25, pp. i110-i118.

McLachlan, G. J., et al., "The EM Algorithm and Extensions", John Wiley & Sons, Mar. 2008.

Meier, L., et al., "The group lasso for logistic regression", Royal Statistical Society, Feb. 2008, vol. 70, Issue 1, pp. 53-71.

"Northern Hemisphere Teleconnection Patterns", National Oceanic and Atmospheric Administration: Climate Prediction Center. http://www.cpc.ncep.noaa.gov/data/teledoc/telecontents.shtml, 2011.

Rand, W., "Objective Criteria for the Evaluation of Clustering Methods", American Statistical Association, Dec. 1971, vol. 66, No. 336, pp. 846-850.

Fruhwirth-Schnatter, S., et al., "Finite Mixture and Markov Switching Models", Nov. 2006, Springer.

Yao, Q., "Test for Change-Points with Epidemic Alternatives", Biometrika Trust, Mar. 1993, vol. 80, No. 1, pp. 179-191.

Yuan, M., et al., "Model selection and estimation in regression with grouped variables", Royal Statistical Society, Feb. 2006, vol. 68, Part 1, pp. 49-67.

Zou, H., "The Adaptive Lasso and Its Oracle Properties", American Statistical Association, Dec. 2006, vol. 101, No. 476, pp. 1418-1429.

\* cited by examiner

CHANGE POINT DETECTION IN CAUSAL MODELING

FIELD

The present application relates generally to artificial intelligence, machine learning, causal inference and causal modeling and more particularly to change point detection in causal modeling.

BACKGROUND

In business applications, time series data can be leveraged for decision support, anomaly detection and monitoring, for example, anomaly detection from IT monitoring data, abnormality identification in trading data, condition-based monitoring in oil platforms, anomaly diagnosis for manufacturing tool, and in other applications. In such contexts, modeling correlation is not enough, and the inventors in the present application have recognized that there is a need to understand and quantify causal effects among the various parameters involved. In addition, in relevant applications the underlying dependency structures may vary over time. Hence, the inventors in the present application have also recognized that there is a need to develop methods that do not assume a static causal graph.

Traditional methods for causal modeling assume a static causal graph modeling. For instance, in traditional methods, a unique static model is learnt and anomaly detection is performed by reference, i.e., by learning a model of "normal" relationships, and performing likelihood evaluation of observed data based on the reference model, or learning another static model for an evaluation dataset and comparing it with the reference model.

No change point detection method exists for temporal causal modeling. Yet in many relevant applications, the underlying dependency structures may vary over time. Anomaly detection provides a good example, where the primary interest is to understand how and when the causal relationships between various variables may have been altered over time. For instance, the existing Dirichlet process (DP)-based methods do not allow state estimation. Certain change point methods only allow for a new state when a change point occurs, e.g., change to a previous state is not allowed. Markov Chain Monte Carlo (MCMC)-based methods are computationally intensive and may be considered impractical.

The detection of and the inference about time series data that may come from multiple regimes is known as the "change point modeling" in statistical literature. However, change point modeling for sparse causal graphical models has not been discussed in the literature. Furthermore, most literature in change point modeling does not allow the process to return to previous states.

BRIEF SUMMARY

A method for change point detection in causal modeling, in one aspect, may include receiving a multivariate time-series data, and modeling a Markov switching vector autoregressive formulation to detect structural changes in causal dependency. The method may also include solving for unknown parameters in the Markov switching vector autoregressive formulation, the unknown parameters including $\psi=(\theta, \sigma^2, P)$, wherein $\theta$ represents a VAR coefficient, $\sigma^2$ represents variance of Markov states, and P represents a transition matrix. The solving step may include performing a two-step iterative EM algorithm which incorporates Bayesian hierarchical group selection until the algorithm converges. The two-step iterative EM algorithm may include an E-step for imputing missing Markov state data $S_t$ through backward-forward steps and assigning Markov states to each time points, and an M-step for updating parameters $\psi$ and selecting causal effects through Bayesian hierarchical group Lasso, wherein change points in causal dependency is detected based on the parameters $\psi$.

In another aspect, a method for change point detection in causal modeling in climate data may be provided. The method may include receiving data, $\{Y_{j,t}, j=1, \ldots, d; t=1, \ldots, T\}$ where $Y_{j,t}$ is a measurement taken for climate feature j at time t, in a time series 1 ... T. The method may also include initializing Markov state variables $\{S_t\}_{t=1,\ldots,T}$ where $S_t=k$ if time point t is in state k wherein $S_t$ represents the state at time t, and initializing VAR coefficient $\theta_{ijk}$ representing causal effects of feature i to feature j in state k. The method may further include, based on the received data, executing a two-step iterative EM algorithm which incorporates Bayesian hierarchical group selection until the algorithm converges. The two-step iterative EM algorithm may include an E-step for imputing missing data $S_t$ through backward-forward steps and assigning Markov states to each time points, and an M-step for updating parameters $\psi$ and selecting causal effects through Bayesian hierarchical group Lasso, wherein $\psi=(\theta, \sigma^2, P)$, $\theta$ represents the VAR coefficient, $\sigma^2$ represents variance of each Markov states, and P represents a transition matrix. The method may further include detecting change points in climate based on the parameters $\psi$, and detecting causal effects in climate based on the parameters $\psi$.

A system for change point detection in causal modeling in climate data, in one aspect, may include a Markov switching causal modeling module operable to receive $\{Y_{j,t}, j=1, \ldots, d; t=1, \ldots, T\}$ where $Y_{j,t}$ is a measurement taken for climate feature j at time t, in a time series 1 ... T. The Markov switching causal modeling module may be further operable to initialize Markov state variables $\{S_t\}_{t=1,\ldots,T}$ where $S_t=k$ if time point t is in state k wherein $S_t$ represents the state at time t. The Markov switching causal modeling module may be yet further operable to initialize VAR coefficient $\theta_{ijk}$ representing causal effects of feature i to feature j in state k. The Markov switching causal modeling module may be further operable to execute a two-step iterative EM algorithm which incorporates Bayesian hierarchical group selection until the algorithm converges, the two-step iterative EM algorithm including an E-step for imputing missing data $S_t$ through backward-forward steps and assigning Markov states to each time points, and an M-step for updating parameters $\psi$ and selecting causal effects through Bayesian hierarchical group Lasso, wherein $\psi=(\theta, \sigma^2, P)$, $\theta$ represents the VAR coefficient, $\sigma^2$ represents variance of each Markov states, and P represents a transition matrix. The Markov switching causal modeling module may be also operable to detect change points in climate and causal effects in climate based on the parameters $\psi$.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In the present disclosure in one embodiment, a modeling framework, referred to as Markov Switching Causal Modeling, is provided. The Markov Switching Causal Modeling of the present disclosure in one embodiment includes a Markov switching vector autoregressive (MS-VAR) model that detects the structural changes of the causal relationship in multivariate time-series data. A latent state variable is introduced that stands for the state of the observed system at each time point. The approach of the present disclosure in one embodiment allows for such structural changes by a set of latent state variables, which are modeled by a discrete-time discrete-state Markov process. At each state, the method may further impose a sparse structure of the causal graphical models through a hierarchical Bayesian group Lasso method where the lagged variables belonging to the same time series are considered as a group. In one aspect of the present disclosure, an efficient algorithm may be developed for computation, based on the Expectation-Maximization method. The approach of the present disclosure may be of value in online anomaly detection and graphical learning with multivariate time series data.

A methodology of the present disclosure in one embodiment detects the change points of multivariate time series data and learns the underlying sparse causal graphical structures. In addition, the methodology in one embodiment allows for the process from which the multiple time-series data are observed to switch back to the previous states at a change point, e.g., to accommodate circumstances where the systems may be back to normal after abnormal periods. Take as an example an information technology (IT) infrastructure, for instance, where the primary interest is to monitor the IT system and to detect the abnormal conditions of the IT system. Here, the key performance indicators of the IT system are being observed over time. With such information, an IT expert or the like learns whether the IT system is in the normal or abnormal conditions at a given time. Following an abnormal condition (e.g., an outage, a memory leak or another condition), the IT expert or the like may fix the problem and the IT system may return to a normal condition; alternatively, the system may recover on its own and thus go back to normal without any human intervention.

The method in one embodiment of the present disclosure not only may detect causal structural changes, but also estimate the causal graph for each state. As an illustration of its usefulness in real applications, the method may be applied to a climate measurement data, which for example may include monthly measurements for a set of climate indices. Another example of real application as described above may be to an IT system. Generally, inferring causality in multivariate time-series data may be applicable in a variety of fields including social sciences, climate science and microbiology.

In one aspect, a Bayesian Markov switching model is developed for change point detection in sparse causal graphical learning. A latent discrete state variable may indicate the regime from which the observations at each time point have been drawn. A regime refers to a state of a system, e.g., normal or abnormal. A latent discrete state variable refers to a state variable that is discrete and latent. For example, assume there are K states, then the state variable belongs to $\{1, \ldots, K\}$, so it is discrete; the state variables are latent because they are not directly observed but indirectly observed through their influence on observed data. The methodology of the present disclosure in one embodiment estimates these state variables. In addition, the systems can switch back to the previous states at a change point. To obtain the sparse causal graphs, at each state, the sparse structure of the causal graphs may be imposed through the hierarchical Bayesian group Lasso method, where the lagged variables belonging to the same time series are considered as a group. Lagged variables of the same time series are, e.g., $\{Y_{j,t-1}, \ldots, Y_{j,t-2}, \ldots, Y_{j,t-L}\}$, where $Y_j$ represents a time-series variable (or a time-series feature), j represents the index of time series variable (or feature), t-1 ... t-L represents the L time points prior to time t. In the present application, the expressions "feature" and "time series variable" are used interchangeably. This allows for an "all-in all-out" fashion for the selections of variables within a group, and offers better interpretability for the causal relationships.

As described above, a framework that models sparse causal networks in one embodiment of the present disclosure makes use of the Vector Autoregressive (VAR) model. The VAR model assumes that the value of the multivariate time series at time t is a linear combination of its L past values and Gaussian measurement noise. Namely, let $\{Y_{j,t}, j=1, \ldots, d; t=1, \ldots, T\}$ denote the d-multivariate time series observed at T consecutive time points, the VAR model is defined as $$Y_{j,t} = \sum_{i=1}^{d} \sum_{l=1}^{L} \beta_{ij,l} Y_{i,t-1} + \varepsilon_{j,t}, \; \varepsilon_{j,t} \colon N(0, \sigma^2), \quad (1)$$

where L is the maximum lag and $\beta_{ij,l}$ are the lagged coefficients.

Based on an assumption that a cause should precede its effects, an operational notion of causality in the case of VAR models states that a time series $Y_i$ has a causal influence on another time series $Y_j$ if $\beta_{ij,l}$ is non-zero for at least one $l \in \{1, \ldots, L\}$. Note that this operational notion can be seen as a generalization of the notion of Granger causality, which is defined for a pair of time series and considers that a time series $Y_i$ Granger-causes another time series $Y_j$ if the past values of $Y_i$ are useful in predicting the future values of $Y_j$, with statistical significance, beyond what can be achieved using the past values of $Y_j$ alone. This setup induces a directed graph over the time series variables whereby an edge from time series $Y_i$ to time series $Y_j$ represents the causal influence of $Y_i$ on $Y_j$.

In the present disclosure, sparse modeling techniques are used to estimate the VAR model coefficients. Further, methodologies of the present disclosure may enforce group-wise sparsity to incorporate the grouping structure induced by the lagged variables according to the time series they belong to. In one embodiment of the present disclosure, the sparsity pattern is thus induced over the groups $\{\beta_{ij,l}\}_{l=1}^{L}, i=1, \ldots, d, j=1, \ldots d$, rather than individual coefficients. In one embodiment of the present disclosure, the group Lasso estimator is employed for group variable selection. Given response vector Y, predictor matrix X, and J feature groups which partition the set of predictors, the Group Lasso solves $$\operatorname*{argmin}_{\beta} \frac{1}{2} \left\| Y - \sum_{j=1}^{J} X_{G_j} \beta_{G_j} \right\|_2^2 + \lambda \sum_{j=1}^{J} \| \beta_{G_j} \|_2,$$

where $X_{G_1}, \ldots, X_{G_J}$ are the groupings within the features of X and $\beta_{G_1}, \ldots, \beta_{G_J}$ are the coefficient vectors for variables in group $G_1, \ldots, G_J$ respectively. In the context of the aforementioned VAR model, the Group Lasso can be applied with variable groupings $\{\{Y_{1,t-l}\}_{l=1}^{L}, \ldots, \{Y_{d,t-l}\}_{l=1}^{L}\}$, leading to the minimization of $$\frac{1}{2}\sum_{t=L+1}^{T}\left(Y_{j,t} - \sum_{i=1}^{d}\sum_{l=1}^{L}\beta_{ij,l}Y_{i,t-1}\right)^2 + \lambda \sum_{i=1}^{d}\left(\sum_{l=1}^{L}\beta_{ij,l}^2\right)^{1/2}, \quad (2)$$

for $j=1, \ldots, d$. As the Group Lasso penalty induces group-wise variable selection, selection for the lagged variables belonging to the same time series may be performed in an "all-in all-out" fashion through the minimization of Eq. (2).

As described above, a hierarchical Bayesian framework that adds flexibility to the original Group Lasso is utilized in the present disclosure in one embodiment. In this approach, a hierarchical prior is specified for the regression coefficients, which results in the maximum a posterior (MAP) estimation with sparsity-inducing regularization, and can be seen as an iteratively reweighted adaptive group Lasso estimator. Here adaptivity refers to the fact that the penalty amount may differ across groups of regression coefficients, similarly to the Adaptive Lasso algorithm. Moreover, the penalty amount $\lambda$ is iteratively updated, therefore alleviating the need for parameter tuning (as opposed to non-bayesian approaches). An additional benefit of such a quasi-bayesian approach is its computational efficiency, which allows for graceful accommodation of high-dimensional datasets.

Markov Switching Causal Modeling

The causal dependencies between current and past observations may be represented by temporal causal graphs. The present disclosure in one aspect considers Granger Causality, by definition of which variable $Y_i$, is the cause of variable $Y_j$ if $Y_i$'s past values are helpful in predicting $Y_j$'s future values. Here, i and j represent feature indices. In one embodiment of the present disclosure, a framework for sparse causal inference is a VAR model Eq. (1), where a non-zero $\beta_{ij,l}$ indicates that the past values of $Y_i$ have an effect on the prediction of $Y_j$, hence there exists an arc from $Y_i$ to $Y_j$ in the temporal causal graph. Most of the traditional methods assume that the underlying temporal graph does not vary over time. The present disclosure extends the traditional methods to allow for structural changes in the causal relationship over time. In one embodiment, a Markov switching vector autoregressive (MS-VAR) model is presented to detect and infer the structural changes in the causal graphs.

MS-VAR of the present disclosure in one embodiment includes a latent state variable $S_t$, $S_t \in \{1, 2, \ldots, K\}$, at each time point, where K is the total number of possible states and $S_t$ stands for the state at time t. Given the state variables $\{S_t\}$, the present disclosure models the observed data $Y_{j,t}$ using the VAR model, $$Y_{j,t} = \sum_{i=1}^{d}\sum_{l=1}^{L}\beta_{ijS_t,l}Y_{i,t-1} + \varepsilon_{j,t}, \varepsilon_{j,t}: N(0, \sigma_{S_t}^2). \quad (3)$$

The state variables $S_t \in \{1, \ldots, K\}$ are defined jointly on all features and does not depend on j. The present disclosure further models $S_t$ as a Markov chain, wherein the K×K transition probability matrix is defined as $$P = \begin{pmatrix} p_{11} & p_{12} & \cdots & p_{1K} \\ p_{21} & p_{22} & \cdots & p_{2K} \\ \vdots & \cdots & \cdots & \vdots \\ p_{K1} & p_{K2} & \cdots & p_{KK}. \end{pmatrix}$$

The element $p_{k'k}$ in P is the transition probability from state k' to k:

$$p_{k'k} = Pr(S_t = k | S_{t-1} = k'), \forall k, k' \in \{1, \ldots, K\}.$$

The transition probability matrix defined above is different from that of a known transition probability matrix in that the known transition probability matrix has zero entries except for the diagonal elements and the one right next to the diagonal elements. This implies that the known model only allows for a new state when a change point occurs. Whereas with the full matrix formulation of the transition probability matrix in the formulation of the present disclosure in one embodiment, the present disclosure allows for the process to change either back to a previous state or forward to a new state. Moreover, according to the known method, the expected duration of time for the process to remain in state k once it is in that state is $1/(1-p_{kk})$.

According to the MS-VAR model, if two time points are from the same state, they will have the same set of AR coefficients. For simplicity, the present disclosure denotes the regression coefficients at state k by $\theta_{ijkl}$ throughout the rest of the disclosure ($\beta_{ijS_t,l} = \theta_{ijkl}$, if $S_t = k$). $\theta_{ijkl}$ represents the regression coefficient for i-th and j-th feature correlation in state k with lag l. A non-zero $\theta_{ijkl}$ indicates that the current value of feature i is influenced by the l-th past value of feature j. The model of the present disclosure in one embodiment allows the causal graphs to change dynamically as the states $\{S_t\}$ change over time.

Causal Inference Via Bayesian Group Lasso

In the Granger graphical modeling, the primary research interest is to select the lagged variables (features) for a given time series as a group, in contrast to the traditional variable selection problems where the lagged variables are selected individually. The grouping structure is taken into account in the graphical Granger modeling, for instance, by utilizing the group Lasso method, which performs variable selection with respect to model fitting criteria with different penalties for intra- and inter-group variable inclusions, thereby allowing for the variables belonging to the same group to be selected in an "all-in all-out fashion". In the present disclosure's context, for a given (i, j, k), the $\{\theta_{ijkl}, l=1, \ldots, L\}$ is defined as a group. The present disclosure further adapts the Bayesian hierarchical framework for the group variable selection as follows:

$$\theta_{ijkl} | \sigma_{ijk}^2 : N(0, \sigma_{ijk}^2), \quad (4)$$

$$\sigma_{ijk}^2 | \tau_{ijk} : G\left(\frac{L+1}{2}, 2\tau_{ijk}^2\right),$$

$$\tau_{ijk} | a_{ijk}, b_{ijk} : IG(a_{ijk}, b_{ijk}),$$

where G(a,b) represents the Gamma distribution with density function $$f(x) = x^{a-1}\frac{e^{-x/b}}{b^a\Gamma(a)},$$

and IG(a,b) represents the Inverse Gamma distribution whose density takes the form $$f(x) = \frac{b^a}{\Gamma(a)} x^{-a-1} \exp(-b/x).$$

This hierarchical formulation implies an adaptive version of the group lasso algorithm and allows for automatic update of the smoothing parameters. $\theta_{ijk} = \{\theta_{ijkl}\}_{l=1}^{L}$ is the VAR coefficient quantifying the effect of the past values of variable $Y_i$ on the prediction of variable $Y_j$ at k-th state. In one embodiment of the present disclosure, we gave a hierarchical framework to $\theta_{ijkl}$.

Level 1: the prior distribution of $\theta_{ijkl}$ is normal distribution with mean 0 and variance $\sigma^2_{ijkl}$.

Level 2: the variance parameter $\sigma^2_{ijk}$ is distributed as Gamma distribution with the shape parameter $$a = \frac{L+1}{2}$$

(L is the maximum lag of VAR model) and scale parameter $b = 2\tau^2_{ijk}$

Level 3: the scale parameter $\tau^2_{ijk}$ in the Gamma distribution follows Inverse Gamma where $a_{ijk}$ and $b_{ijk}$ are the hyperparameters characterize the IG distribution $\theta_{ijk} = \{(\theta_{ijkl})_{l=1}^{L}\}$ can be estimated by the MAP estimate, which takes the form $$\text{argmax}_{\theta_{ijk}} \log L(\theta_{ijk}|a_{ijk}, b_{ijk}) + \log p(\theta_{ijk}|a_{ijk}, b_{ijk}).$$

Integrating $\sigma^2_{ijk}, \tau_{ijk}$ out, the marginal density for $\theta_{ijk}$ can be written as $p(\theta_{ijk}|a_{ijk}, b_{ijk})$ $$p(\theta_{ijk}|a_{ijk},b_{ijk}) = \frac{(2b_{ijk})^{-L}\pi^{-(L-1)/2}\Gamma(L+a_{ijk})}{\Gamma((L+1)/2)\Gamma(a_{ijk})}\left(\frac{\|\theta_{ijk}\|_2}{b_{ijk}}+1\right)^{-a_{ijk}-L}$$

where $\|\theta_{ijk}\|_2 = \sqrt{\sum_{l=1}^{L}\theta_{ijkl}^2}$ is the $L_2$ norm of $\theta_{ijk}$. The marginal distribution includes the $L_2$ norm of $\theta_{ijk}$, which is directly related to the penalty term in the group lasso.

The marginal likelihood resulting from the hierarchical group lasso prior, however, is not concave. As a result, finding the globe mode by direct maximization may not be feasible. An alternative approach may be to find local modes of the posterior using the Expectation-Maximization (EM) algorithm with $\tau_{ijk}$ being treated as latent variables. This leads to the following iteratively reweighted $l_q$—minimization algorithm, $$\theta_{ijk}^{(m+1)} = \text{argmax}_{\theta_{ijk}} \log p(Y|\theta_{ijk}) - w_{ijk}^{(m)}\|\theta_{ijk}\|_2$$

where $$w_{ijk}^{(m)} = \frac{a_{ijk}+L}{\|\theta_{ijk}^{(m)}\|_2 + b_{ijk}}.$$

For the parameters in the transition probability matrix, the present disclosure assigns the Dirichlet distribution as their prior distributions. For a given state k, the transition probabilities to all possible states $p_k = (p_{k1}, \ldots, p_{kK})$ follows Dirichlet distribution, taking the form $$p(p_k.) \propto \prod_{k'=1}^{K} p_{kk'}^{\alpha_{k'}-1},$$

where $\alpha_{k'}$ are the hyperparameters in the Dirichlet distribution. One choice is $\alpha_{k'}=1$, corresponding to a noninformative prior on $p_k$. The Dirichlet distribution is a popular prior for the probabilities of discrete random variables. It is the conjugate prior for the multinomial distribution and the computation is very efficient. Finally, to complete the Bayesian hierarchical model, the present disclosure in one embodiment assigns the following noninformative prior to variance, $$p(\sigma_k^2) \propto \frac{1}{\sigma_k^2}.$$

Algorithm

Let $\theta = \{\theta_{ijk}\}_{i,j=1,\ldots,d;k=1,\ldots,K}$, $\sigma^2 = \{\sigma\text{hd }k^2\}_{k=1,\ldots,K}$ and recall that P is the transition matrix. The unknown parameters in the MS-VAR model are $\psi = (\theta, \sigma^2, P)$, and the present disclosure in one embodiment estimates them by MAP estimates, which can be obtained by maximizing the posterior distribution $p(\psi|Y)$. Since the values of state variables $S_t$ are missing, the present disclosure in one embodiment may apply (expectation maximization) EM algorithm. EM algorithm finds maximum likelihood or MAP estimates of parameters when the model involves latent variables or missing data. When the goal is to find MAP estimates, EM algorithm converges to the global modes of the posterior distribution by iterating between an Expectation (E) step and a Maximization (M) step. At E-step, it computes the expectation of joint posterior distribution of latent variables and unknown parameters conditional on the observed data, denoted by $Q(\psi; \psi^{(m)})$. Let $Y_t$ be the d—dimensional vector of observations at time t and $Y_{t_1:t_2}$ is the collection of the measurements from time $t_1$ to $t_2$. For simplicity, the present disclosure in one embodiment sets $D_0 = \{Y_1, \ldots, Y_L\}$ to be the initial information including the first L observations and then relabels $Y_t \Rightarrow Y_{t-L}$ for t>L. At the m+1th EM iteration, given the estimated parameters from mth EM iteration $\psi^{(m)}$, the methodology of the present disclosure in one embodiment updates model parameter $\psi$ by computing (in the E-step) and maximizing (in the M-step $Q(\psi; \psi^{(m)})$ which takes the form of $$Q(\psi; \psi^{(m)}) = E_{S,\tau|Y,D_0,\psi^{(m)}}[\log p(\psi, S, \tau|Y_{1:Y}, D_0)] =$$

$$\text{const} + \sum_{t=1}^{T}\sum_{k=1}^{K} L_{tk}\log f(Y_t|Y_{t-1:t-L}, S_t=k, \theta, \sigma^2) +$$

$$\sum_{t=2}^{T}\sum_{k=1}^{K}\sum_{k'=1}^{K} H_{t,k'k}\log p(S_t=k|S_{t-1}=k', P) + \sum_{k=1}^{K} L_{1k}\log \pi_k -$$

$$\sum_{i=1}^{d}\sum_{j=1}^{d}\sum_{k=1}^{K} w_{ijk}\|\theta_{ijk}\|_2 - \sum_{k=1}^{K}\log \sigma_k^2 + \sum_{k=1}^{K}\sum_{k'=1}^{K}(\alpha_k - 1)\log p_{k'k}$$

where $L_{tk} = p(S_t=k|Y_{1:T}, D_0, \psi^{(m)})$ and $H_{t,k'k} = p(S_{t-1}=k', S_t=k|Y_{1:T}, D_0, \psi^{(m)})$ are the posterior probability of all hidden state variables and $\pi_k = \text{Pr}(S_1=k|Y_{1:T}, D_0)$ is the probability of the initial state being k.

EM is an iterative algorithm. The superscripts (e.g., m+1 and m) indicate the number of iteration. The algorithm below is at m+1 th EM iteration, those superscripted by m+1 means they are updated values at m+1 th iteration and those superscripted by m means they are the estimated values from m-th iteration.

In the E-step, the posterior probability $L_{tk}$ and $H_{t,k'k}$ can be calculated using the three step backward and forward algorithm as follows.

1. Compute the forward probability $\alpha_k^{(m+1)}(t)=p(Y_{1:t}, S_t=k|D_0, \psi^{(m)})$ by going forward in time as follows $$\alpha_k^{(m+1)}(1) = p(Y_1, S_1 = k | D_0, \psi^{(m)})$$
$$= \pi_k^{(m)} p(Y_1 | S_1 = k, D_0, \psi^{(m)})$$

$$\alpha_k^{(m+1)}(1) = p(Y_{1:t}, S_t = k | D_0, \psi^{(m)})$$
$$= \sum_{k'=1}^{K} f(Y_t | Y_{t-L:t-1}, S_t = k, D_0, \psi^{(m)}) p_{k'k}^{(m)} \alpha_{k'}^{(m+1)}(t-1)$$

2. Compute the backward probability $\beta_k^{(m+1)}(t)=f(Y_{t+1:T}|Y_{1:t}, D_0, S_t=k, \psi^{(m)})$ by going backward in time as follows $$\beta_k^{(m+1)}(T) = 1$$
$$\beta_k^{(m+1)}(t) = f(Y_{t+1:T} | Y_{1:t}, D_0, S_t = k, \psi^{(m)})$$
$$= \sum_{k'=1}^{K} f(Y_{t+1} | Y_{t:t-L+1}, D_0, S_{t+1} = k', \psi^{(m)}) \beta_{k'}(t+1) p_{kk'}^{(m)}$$

3. Compute the posterior probability $$L_{tk}^{(m+1)} = p(S_t = k | Y_{1:T}, D_0, \psi^{(m)})$$
$$= \frac{\alpha^{(m+1)}(t) \beta^{(m+1)}(t)}{f(Y_{1:T} | D_0, \psi^{(m)})},$$

$$H_{t,k'k}^{(m+1)} = p(S_{t-1} = k', S_t = k | Y_{1:T}, D_0, \psi^{(m)})$$
$$= \frac{\alpha_{k'}^{(m+1)}(t-1) p_{k'k}^{(m)} f(Y_t | S_t = k, Y_{t-1:t-L}, \psi^{(m)}) \beta_k^{(m+1)}(t)}{f(Y | D_0, \psi^{(m)})}$$

In the M-step, the present disclosure in one embodiment updates $\psi$ by maximizing $Q(\psi; \psi^{(m)})$;

1. The VAR coefficients $\theta_{ijk}^{(m+1)}$ are estimated by minimizing $$\sum_{t=1}^{T} \frac{1}{2} L_{tk}^{(m+1)} \left(Y_{j,t} - \sum_{i=1}^{P} X_{ti} \theta_{ijk}\right)^2 / \sigma_k^{2,(m)} + \sum_{i=1}^{P} w_{ijk}^{(m+1)} P \theta_{ijk} P_2$$

given updated weights $$w_{ijk}^{(m+1)} = \frac{a_{ijk} + L}{\|\theta_{ijk}^{(m)}\|_2 + b_{ijk}}.$$

where $X_{ti}=(Y_{i,t-1}, \ldots, Y_{i,t-L})$.

The above regularized minimization problem can be transformed into a standard group lasso formulation by appropriately rescaling $Y_{j,t}$ and $X_{ti}$ (See Ming Yuan, Yi Lin, "Model selection and estimation in regression with grouped variables," *Journal of the Royal Statistical Society, Series B*, 68:49-67, 2006). This group lasso problem can be solved efficiently by using the optimization procedure, e.g., proposed by Lukas Meier, Sara van de Geer, and Peter Buhlmann, "The group lasso for logistic regression," *Journal of the Royal Statistical Society*, 70(1):53-71, 2008.

2. The variance $\sigma_{0,k}^{2,(m+1)}$ of each Markov states are $$\sigma_k^{2,(m+1)} = \frac{1}{dT_k^{(m+1)} + 2} \sum_{j=1}^{d} \sum_{t=1}^{T} L_{tk}^{(m+1)} \left(Y_{j,t} - \sum_{i=1}^{P} X_{ti} \theta_{ijk}^{(m+1)}\right)^2$$

where $$T_k^{(m+1)} = \sum_{t=1}^{T} L_{tk}^{(m+1)}.$$

3. The transition probability $p_{k'k}^{(m+1)}$ are $$p_{k'k}^{(m+1)} = \frac{\sum_{t=1}^{T} H_{t,k'k}^{(m+1)} + \alpha_k - 1}{\sum_{t=1}^{T} L_{t,k}^{(m+1)} + \sum_{k=1}^{K} (\alpha_k - 1)}.$$

4. The initial probability $\pi_k^{(m+1)}=L_{1k}^{(m+1)}$.

Figure 1:
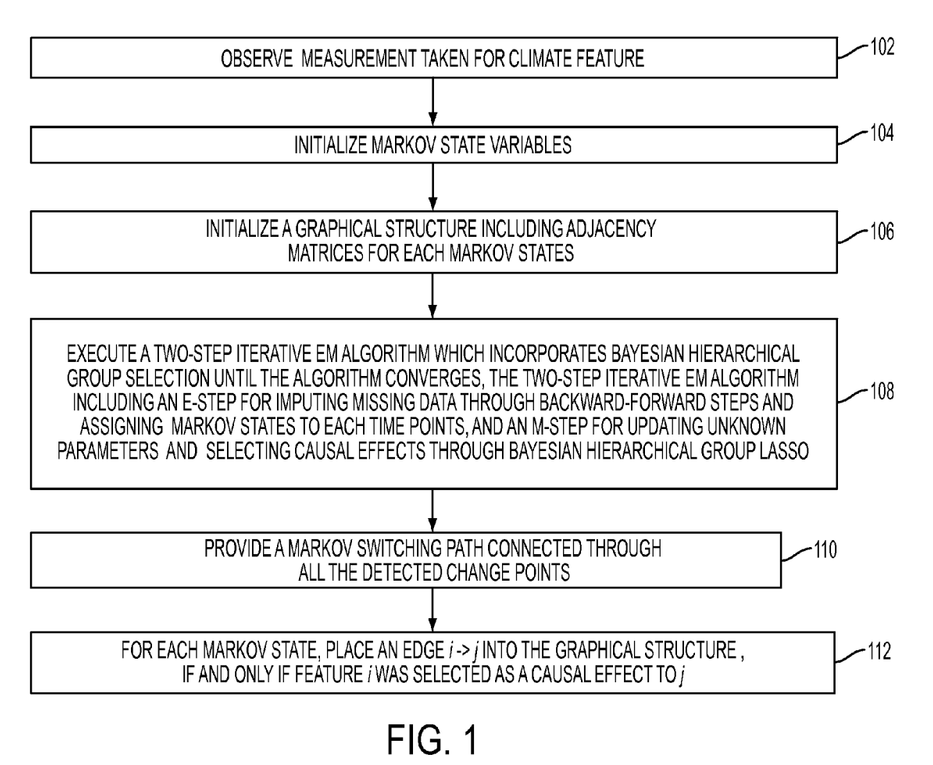
FIG. 1 is a flow diagram illustrating a generic Markov switching causal modeling method of the present disclosure in one embodiment.

The algorithm iterates between the E-step and M-step until it converges. The algorithm is summarized in FIG. 1. FIG. 1 is a flow diagram illustrating a generic Markov switching causal modeling method of the present disclosure in one embodiment.

Figure 2A:
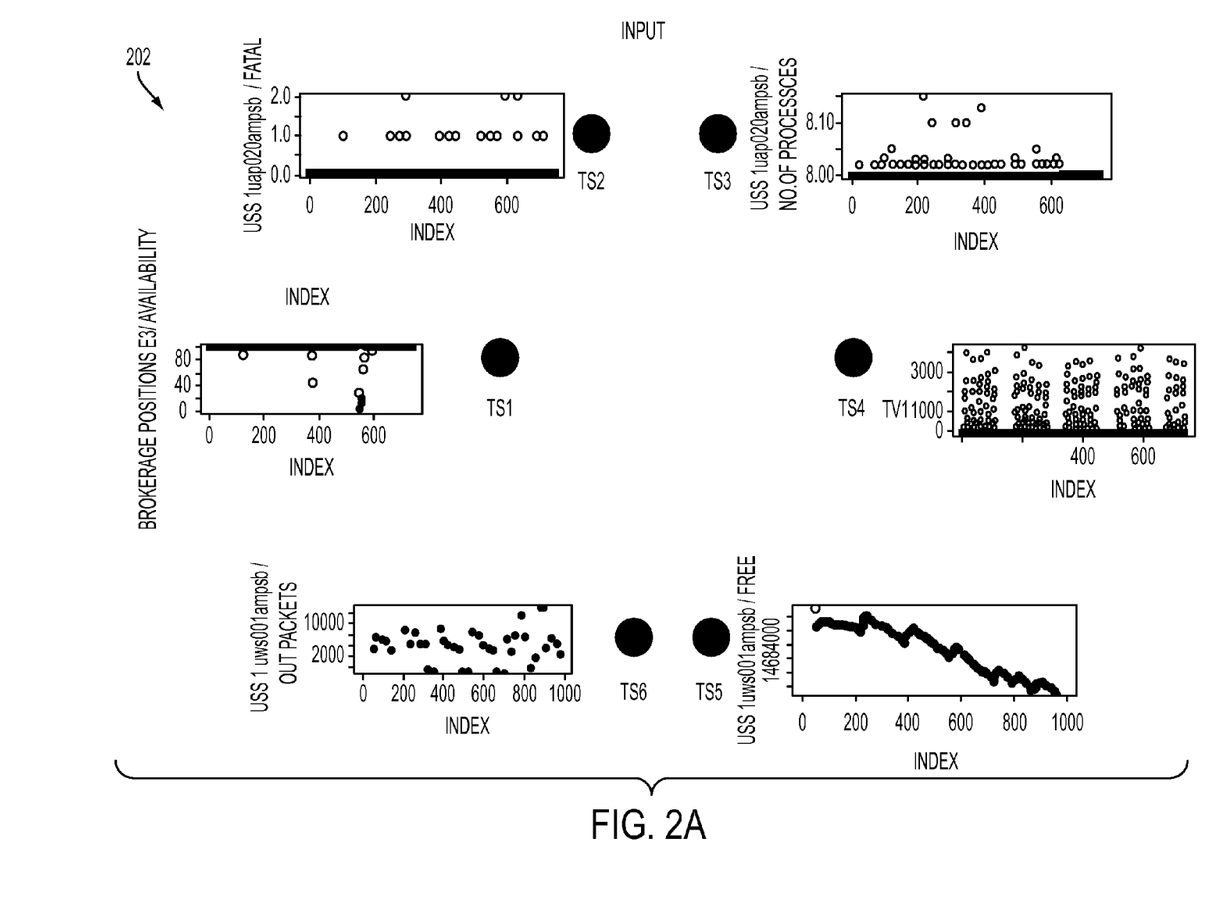
FIG. 2 shows the inputs and output in the methodology of the present disclosure in one embodiment.
Figure 2B:
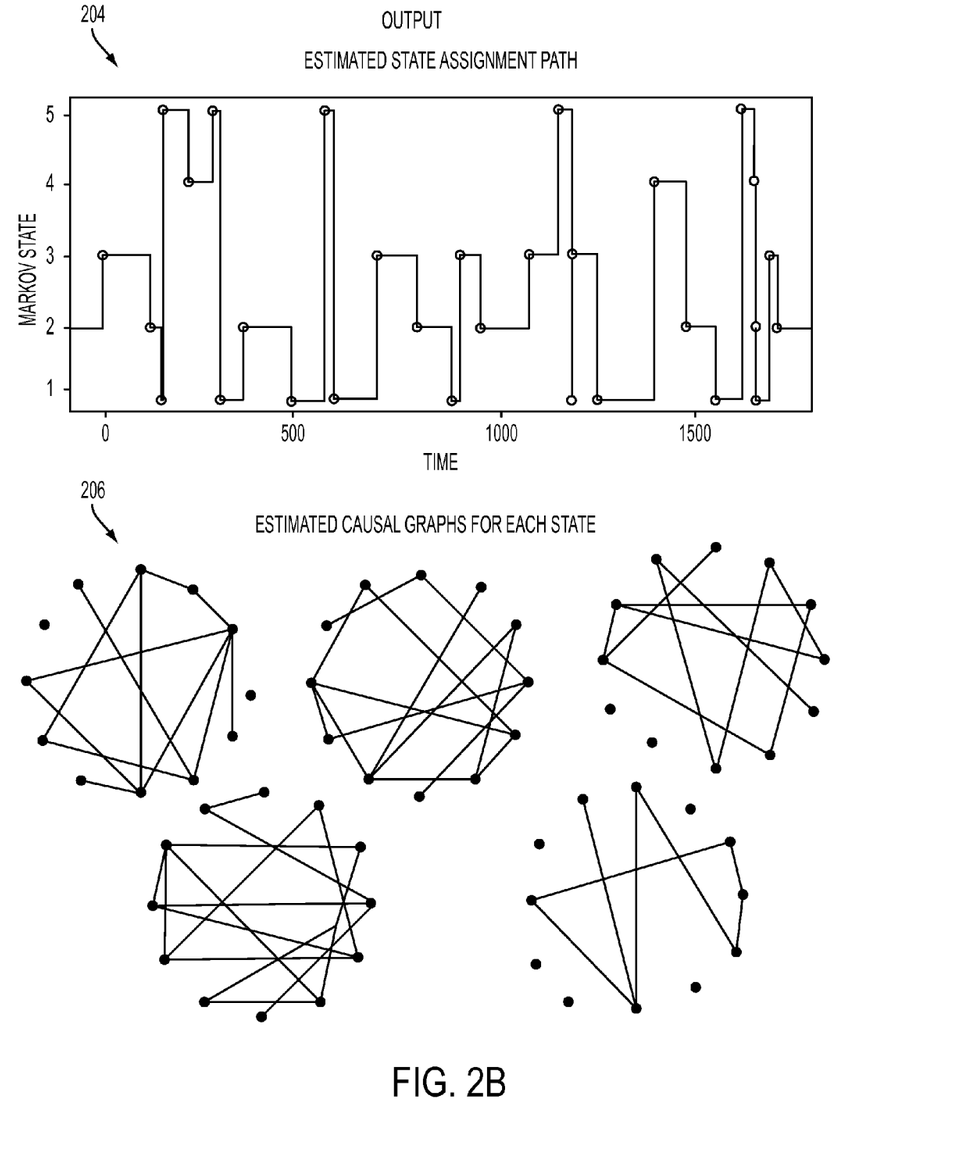

Markov Switching Causal Modeling
Input:
  Observations: $\{Y_{j,t}, j=1, \ldots, d; t=1, \ldots, T\}$ where $Y_{j,t}$ is a measurement taken for feature j at time t.
  Algorithm: a two-step iterative algorithm which incorporates Bayesian hierarchical group selection, EM.
Initialization:
  Missing data: Markov state variables $\{S_t\}_{t=1, \ldots, T}$ where $S_t=k$ if time point t is in state k.
  VAR Coefficients: $\theta_{ijk}$
Run EM Until the Algorithm Converges:
  Impute missing data $S_t$ through backward-forward steps and assign Markov states to each time points.
  Update the parameters $\psi$ and select causal effects through Bayesian hierarchical group Lasso.
Output:
  Markov switching path connected through all the detected change points. An example of the Markov path is shown in FIG. 2: Estimated state assignment path. The x-axis is the time index and y-axis is the estimated state variables St. It shows how the states of system change over time.

For each Markov state k, place an edge i→j into $E_k$, if and only if feature i was selected as an causal effect to j.

Referring to FIG. 1, at 102, $\{Y_{j,t}, j=1, \ldots, d; t=1, \ldots, T\}$ data is received or observed where $Y_{j,t}$ is a measurement taken for feature j at time t.

At 104, Markov state variables $\{S_t\}_{t=1, \ldots, T}$ are initialized, where $S_t=k$ if time point t is in state k.

At 106, a graphical structure is initialized with adjacency matrices for each Markov states, e.g., VAR coefficients: $\theta_{ijk}$.

At 108, EM is run until the algorithm converges. Running the EM algorithm includes imputing missing data $S_t$ through backward-forward steps and assigning Markov states to each time points by the E-step; and updating the parameters ψ and selecting causal effects through Bayesian hierarchical group Lasso by the M-step.

At 110, a Markov switching path connected through all the detected change points is output.

At 112, for each Markov state k, an edge i→j is placed into $E_k$, if and only if feature i was selected as a causal effect to j.

FIG. 2 shows the inputs and outputs in the methodology of the present disclosure in one embodiment. Inputs to the methodology in one embodiment may include multiple time series $Y_{1,t}, \ldots, Y_{d,t}$. At 202, the input may include multiple time series. For instance, take climate data as an example. Input may be 16-month climate index from January 1951 to May 2007. Outputs to the methodology in one embodiment may include the following shown in FIG. 2. As shown at 204, the output may include estimate path of states change. The x-axis shows the time index. The y-axis shows the values of the states variable at each time. As shown at 206, the output may include a causal graph for each state. The causal graph for the climate example shown in FIG. 3. As an example, the methodology detected 2 states and the change point at August 1978. So there are two causal graphs 302, 304 corresponding to the states. One 302 shows the causal dependence of 16 climate index before August 1978 and another one 304 after August 1978.

The methodology of the present disclosure in one embodiment may be applied to climate data to predict and respond to climate variability. The methodology may uncover causal relationships between various climate variables, characterizing how such relationships may have been altered over time, and detecting the time points at which those changes take place. Understanding climate 'regimes', their specific characteristics and their duration may shed light on the underlying mechanisms in the climate system that resulted in its observed variability.

The method of the present disclosure in one embodiment may be applied with climate indices (e.g., discussed as i and j indices in the above formulations), which are time series data characterizing the state of the climate system over time. These indices describe various atmospheric and oceanic events and are being compiled for climate monitoring. Monthly measurements available at the Climate Prediction Center of the National Oceanic and Atmospheric Administration (NOAA) may be utilized. A brief description of the indices is provided in Table 1. Note that the indices cover all broad categories of climate indices available, namely, Teleconnections (characterizing phenomena where remote locations exhibit related weather changes), Atmosphere, El Nino Southern Oscillation (a climate pattern that occurs across the tropical Pacific Ocean), Sea Surface Temperature Pacific, Sea Surface Temperature Atlantic, and others.

TABLE 1

Climate Indices used for the modeling

| Code | Name | Type |
| --- | --- | --- |
| AMM | Atlantic Meridional Mode | SST Atlantic |
| AO | Arctic Oscillation | Atmosphere |
| EPO | Eastern Pacific Oscillation | Teleconnections |
| GMP | Global Mean Temperature | Others |
| Nino1 + 2 | Extreme Eastern Pacific SST | ENSO |
| Nino3 + 4 | East Central Tropical Pacific SST | ENSO |
| Nino3 | Nino.3 | ENSO |
| Nino4 | Central Tropical Pacific SST | ENSO |
| NOI | Northern Oscillation Index | Teleconnections |
| ONI | Oceanic Nino Index | SST Pacific |
| PDO | Pacific Decadal Oscillation | Teleconnections |
| PNA | Pacific North American Index | Teleconnections |
| Sol. flux | Solar Cycle Flux | Others |
| SOI | Southern Oscillation Index | Atmosphere |
| SW. Monsoon | South Western USA Monsoon | Atmosphere |
| WP | West Pacific Index | Teleconnections |

The multivariate time series data span 57 years (from January 1951 to May 2007). Prior to modeling, non-parametric (linear and quadratic) detrending may be performed, for instance, to detect changes in the causality structure, rather than in trends.

Figure 3:
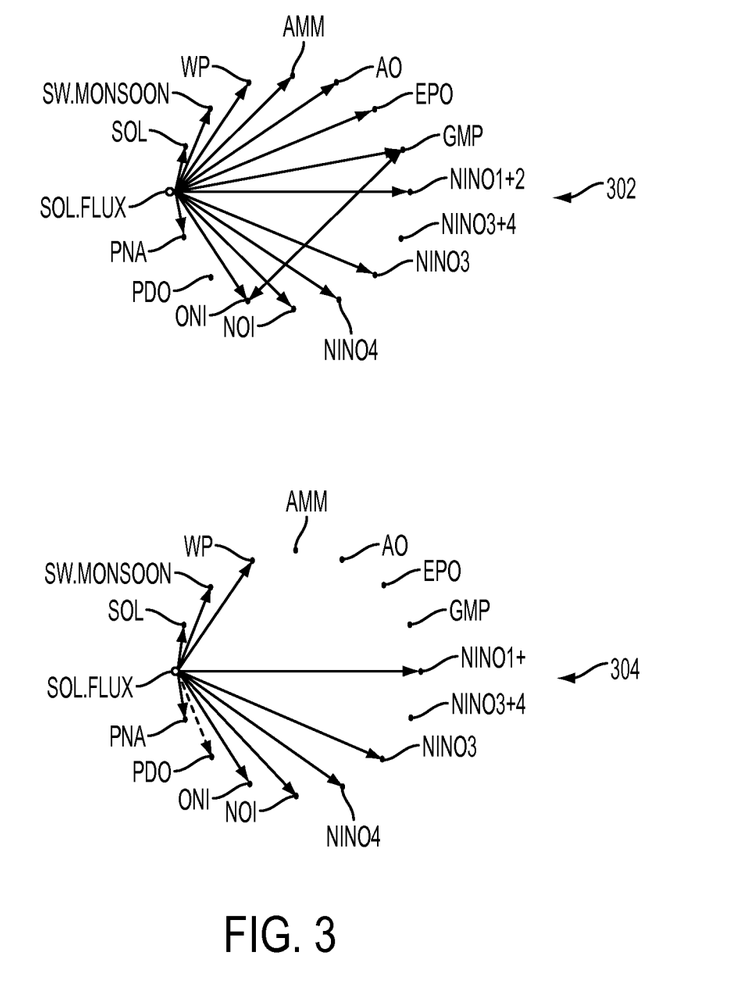
FIG. 3 shows the output causal structures uncovered from the climate indices dataset prior to August 1978 and after August 1978.

In one embodiment, the present disclosure considered a maximum lag of 3 months and set (a=1, b=0.05) in the hierarchical group lasso prior (other values such as a=2, b=0.05 led to similar results). The number of hidden states was varied and it was observed that considering three or more states leads to almost redundant graphs. The results of the experiments are depicted in FIG. 3. Various experiments were performed, using different initial values for the change points. All runs converged to a single change point in August 1978. So the methodology of the present disclosure leads to stable results.

FIG. 3 shows the output causal structures uncovered from the climate indices dataset prior to August 1978 and after August 1978. Edges coded in red (sol.flux to AMM, AO, EPO, GMM, and GMP to ONI) are removed after August 1978 while Edges highlighted in green (sol.flux to PDO) are added.

It is observed that in the two causal graphs the method of the present disclosure uncovered that Solar Flux is a key influencing variable. This is consistent with a various findings from the climate science literature regarding the influence of the Sun's energy outputs on Earth's climate. Focusing on the changes in structure, it is observed that the post May 1978 structure becomes much sparser. Note however that one edge is added from Solar Cycle Flux to Pacific Decadal Oscillation. This intriguing phenomenon may confirm and help understand results from recent modeling studies, which have found resonant responses and positive feedbacks in the ocean-atmosphere system that may lead to an amplified response to solar irradiance variations.

Several researchers have identified change points with respect to the trend of the climate system indices in the mid-1970s, with intense warming starting in 1976. The results utilizing the method of the present disclosure suggest that changes in the underlying relationships governing the climate system occurred slightly later, namely in 1978. This illustrates the usefulness of the approach of the present disclosure in one embodiment, as a complementary tool in monitoring and understanding climate change, as the present disclosure's methodologies in one embodiment detect the structural changes in the relationships governing the climate indices rather than changes in trends. The methodology of the present disclosure in one embodiment also provides a characterization of the nature of such changes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for change point detection in causal modeling in climate data, comprising:

receiving data, $\{Y_{j,t}, j=1, \ldots, d; t=1, \ldots, T\}$ where $Y_{j,t}$ is a measurement taken for climate feature j at time t, in a time series $1 \ldots T$;

initializing Markov state variables $\{S_t\}_{t=1, \ldots, T}$ where $S_t=k$ if time point t is in state k wherein $S_t$ represents the state at time t;

initializing Vector Autoregressive (VAR) coefficient $\theta_{ijk}$ representing causal effects of feature i to feature j in state k;

based on the received data, executing, by a processor, a two-step iterative Expectation-Maximization (EM) algorithm which incorporates Bayesian hierarchical group selection until the algorithm converges, the two-step iterative EM algorithm including an E-step for imputing missing data $S_t$ through backward-forward steps and assigning Markov states to each time points, and an M-step for updating parameters ψ and selecting causal effects through Bayesian hierarchical group Lasso, wherein ψ=(θ, $\sigma^2$, P), θ represents the VAR coefficient, $\sigma^2$ represents variance of each Markov states, and P represents a transition matrix;

detecting change points in climate based on the parameters ψ; and detecting causal effects in climate based on the parameters ψ.

2. The method of claim 1, further including generating a Markov switching path connected through all the detected change points.

3. The method of claim 1, further including:

building a graphical structure for each Markov state k, and placing an edge i→j between node i and node j in the graphical structure, if feature i is detected as a causal effect to j.

4. The method of claim 1, wherein the E-step computes an expectation of joint posterior distribution of latent variables and the parameters ψ conditional on the received data.

5. The method of claim 1, wherein the data $Y_{j,t}$ is modeled using a VAR model as $$Y_{j,t} = \sum_{i=1}^{d} \sum_{l=1}^{L} \beta_{ijS_t,l} Y_{i,t-1} + \varepsilon_{j,t}, \, \varepsilon_{j,t}: N(0, \sigma_{S_t}^2)$$

wherein d is a dimension of time series representing number of features, L is a maximum lag of VAR model, $S_t \in \{1, \ldots, K\}$ is a state variable for time t and $\beta_{ijS_t,l}$ l-th lagged VAR coefficients corresponding to a state at that time; $\sigma_{S_t}^2$ is a variance of random noise corresponding to the state at that time.

6. The method of claim 5, wherein the M-step includes estimating VAR coefficients $\theta_{ijk}^{(m+1)}$ by minimizing $$\sum_{t=1}^{T} \frac{1}{2} L_{tk}^{(m+1)} \left( Y_{j,t} - \sum_{i=1}^{P} X_{ti} \theta_{ijk} \right)^2 \Big/ \sigma_k^{2,(m)} + \sum_{i=1}^{P} w_{ijk}^{(m+1)} \|\theta_{ijk}\|_2$$

given updated weights $$w_{ijk}^{(m+1)} = \frac{a_{ijk} + L}{\|\theta_{ijk}^{(m)}\|_2 + b_{ijk}}$$

wherein $X_{ti} = (Y_{i,t-1}, \ldots, Y_{i,t-L})$
$L_{t,k}^{(m+1)} = p(S_t = k | Y, \psi^{(m)})$ represents posterior probability of all hidden state variables,
L represents the maximum lag;
$\sigma_k^2$ represents the variance of random noise corresponding to the state k at time t, $S_t = k$;
m represents to m-th iteration of the iterative EM algorithm.

7. The method of claim 6, wherein the M-step further includes determining variance $\sigma_k^{2,(m+1)}$ of each Markov states wherein $$\sigma_k^{2,(m+1)} = \frac{1}{dT_k^{(m+1)} + 2} \sum_{j=1}^{d} \sum_{t=1}^{T} L_{tk}^{(m+1)} \left( Y_{j,t} - \sum_{i=1}^{P} X_{ti} \theta_{ijk}^{(m+1)} \right)^2$$

wherein $$T_k^{(m+1)} = \sum_{t=1}^{T} L_{tk}^{(m+1)}.$$

8. The method of claim 7, wherein the M-step further includes determining the transition probability $p_{k'k}^{(m+1)}$ $$p_{k'k}^{(m+1)} = \frac{\sum_{t=1}^{T} H_{t,k'k}^{(m+1)} + \alpha_k - 1}{\sum_{t=1}^{T} L_{t,k}^{(m+1)} + \sum_{k=1}^{K} (\alpha_k - 1)}$$

wherein $(L_{t,k}^{(m+1)} = p(S_t = k | Y, \psi^{(m)})$ and $H_{t,k'k}^{(m+1)} = p(S_{t-1} = k', S_t = k | Y, \psi^{(m)})$ represent posterior probability of all hidden state variables, and $\alpha_k$ is a hyperparameter in prior distribution of transition probability $p_{k'k}^{(m+1)}$.

9. A computer readable storage medium storing a program of instructions executable by a machine to perform a method of change point detection in causal modeling in climate data, comprising:

receiving data, $\{Y_{j,t}, j=1, \ldots, d; t=1, \ldots, T\}$ where $Y^{j,t}$ is a measurement taken for climate feature j at time t, in a time series 1 ... T;

initializing Markov state variables $\{S_t\}_{t=1,\ldots,T}$ where $S_t = k$ if time point t is in state k wherein $S_t$ represents the state at time t;

initializing Vector Autoregressive (VAR) coefficient $\theta_{ijk}$ representing causal effects of feature i to feature j in state k;

based on the received data, executing, by a processor, a two-step iterative Expectation-Maximization (EM) algorithm which incorporates Bayesian hierarchical group selection until the algorithm converges, the two-step iterative EM algorithm including an E-step for imputing missing data $S_t$ through backward-forward steps and assigning Markov states to each time points, and an M-step for updating parameters $\psi$ and selecting causal effects through Bayesian hierarchical group Lasso, wherein $\psi = (\theta, \sigma^2, P)$, $\theta$ represents the VAR coefficient, $\sigma^2$ represents variance of each Markov states, and P represents a transition matrix;

detecting change points in climate based on the parameters $\psi$; and detecting causal effects in climate based on the parameters $\psi$.

10. The computer readable storage medium of claim 9, further including generating a Markov switching path connected through all the detected change points.

11. The computer readable storage medium of claim 9, further including:

building a graphical structure for each Markov state k, and placing an edge i→j between node i and node j in the graphical structure, if feature i is detected as a causal effect to j.

12. The computer readable storage medium of claim 9, wherein the E-step computes an expectation of joint posterior distribution of latent variables and the parameters $\psi$ conditional on the received data.

13. The computer readable storage medium of claim 9, wherein the observed data $Y_{j,t}$ is modeled using the VAR model as $$Y_{j,t} = \sum_{i=1}^{d} \sum_{l=1}^{L} \beta_{ijS_t,l} Y_{i,t-1} + \varepsilon_{j,t}, \, \varepsilon_{j,t}: N(0, \sigma_{S_t}^2)$$

wherein d is a dimension of time series representing number of features, L is a maximum lag of VAR model, $S_t \in \{1, \ldots, K\}$ is a state variable for time t and $\beta_{ijS_t,l}$ is l-th lagged VAR coefficients corresponding to a state at that time; $\sigma_{S_t}^2$ is a variance of random noise corresponding to the state at that time.

14. The computer readable storage medium of claim 13, wherein the M-step includes estimating VAR coefficients $\theta_{ijk}^{(m+1)}$ by minimizing $$\sum_{t=1}^{T} \frac{1}{2} L_{tk}^{(m+1)} \left( Y_{j,t} - \sum_{i=1}^{P} X_{ti}\theta_{ijk} \right)^2 \bigg/ \sigma_k^{2,(m)} + \sum_{i=1}^{P} w_{ijk}^{(m+1)} \|\theta_{ijk}\|_2$$

given updated weights $$w_{ijk}^{(m+1)} = \frac{a_{ijk} + L}{\|\theta_{ijk}^{(m)}\|_2 + b_{ijk}}.$$

wherein $X_{ti}=(Y_{i,t-1}, \ldots, Y_{i,t-L})$,
$L_{t,k}^{(m+1)}=p(S_t=k|Y,\psi^{(m)})$ represents posterior probability of all hidden state variables,
L represents the maximum lag;
$\sigma_k^2$ represents the variance of random noise corresponding to the state k at time t, $S_t=k$;
m represents to m-th iteration of the iterative EM algorithm.

15. The computer readable storage medium of claim 14, wherein the M-step further includes determining variance $\sigma_k^{2,(m+1)}$ of each Markov states wherein $$\sigma_k^{2,(m+1)} = \frac{1}{dT_k^{(m+1)} + 2} \sum_{j=1}^{d} \sum_{t=1}^{T} L_{tk}^{(m+1)} \left( Y_{j,t} - \sum_{i=1}^{P} X_{ti}\theta_{ijk}^{(m+1)} \right)^2$$

where $$T_k^{(m+1)} = \sum_{t=1}^{T} L_{tk}^{(m+1)}.$$

16. The computer readable storage medium of claim 15, wherein the M-step further includes determining the transition probability $p_{k'k}^{(m+1)}$ $$p_{k'k}^{(m+1)} = \frac{\sum_{t=1}^{T} H_{t,k'k}^{(m+1)} + \alpha_k - 1}{\sum_{t=1}^{T} L_{t,k}^{(m+1)} + \sum_{k=1}^{K}(\alpha_k - 1)}$$

wherein ($L_{t,k}^{(m+1)}=p(S_t=k|Y,\psi^{(m)})$ and $H_{t,k'k}^{(m+1)}=p(S_{t-1}=k', S_t=k|Y,\psi^{(m)})$ represent posterior probability of all hidden state variables, and $\alpha_k$ is a hyperparameter in prior distribution of transition probability $p_{k'k}^{(m+1)}$.

17. A system for change point detection in causal modeling in climate data, comprising:
a processor;
a Markov switching causal modeling module operable to receive $\{Y_{j,t}, j=1, \ldots, d; t=1, \ldots, T\}$ where $Y_{j,t}$ is a measurement taken for climate feature j at time t, in a time series 1 ... T;
the Markov switching causal modeling module further operable to initialize Markov state variables $\{S_t\}_{t=1,\ldots,T}$ where $S_t=k$ if time point t is in state k wherein $S_t$ represents the state at time t;
the Markov switching causal modeling module further operable to initialize Vector Autoregressive (VAR) coefficient $\theta_{ijk}$ representing causal effects of feature i to feature j in state k;
the Markov switching causal modeling module further operable to execute on the processor, a two-step iterative Expectation-Maximization (EM) algorithm which incorporates Bayesian hierarchical group selection until the algorithm converges, the two-step iterative EM algorithm including an E-step for imputing missing data $S_t$ through backward-forward steps and assigning Markov states to each time points, and an M-step for updating parameters ψ and selecting causal effects through Bayesian hierarchical group Lasso, wherein ψ=(θ, σ², P), θ represents the VAR coefficient, σ² represents variance of each Markov states, and P represents a transition matrix;
the Markov switching causal modeling module further operable to detect change points in climate and causal effects in climate based on the parameters ψ.

18. The system of claim 17, further wherein a Markov switching path connected through all the detected change points is generated.

19. The system of claim 17, wherein a graphical structure is built for each Markov state k, with an edge i→j placed between node i and node j in the graphical structure, if feature i is detected as a causal effect to j.

20. The system of claim 17, wherein the E-step computes an expectation of joint posterior distribution of latent variables and the parameters ψ conditional on the received data.

21. The system of claim 17, wherein the data $Y_{j,t}$ is modeled using a VAR model as $$Y_{j,t} = \sum_{i=1}^{d} \sum_{l=1}^{L} \beta_{ijS_t,l} Y_{i,t-1} + \varepsilon_{j,t}, \varepsilon_{j,t}: N(0, \sigma_{S_t}^2)$$

wherein d is a dimension of time series representing number of features, L is a maximum lag of VAR model, $S_t \in \{1, \ldots, K\}$ is a state variable for time t and $\beta_{ijS_t,l}$ is l-th lagged VAR coefficients corresponding to a state at that time; $\sigma_{S_t}^2$ is a variance of random noise corresponding to the state at that time.

22. The system of claim 21, wherein the M-step includes estimating VAR coefficients $\theta_{ijk}^{(m+1)}$ by minimizing $$\sum_{t=1}^{T} \frac{1}{2} L_{tk}^{(m+1)} \left( Y_{j,t} - \sum_{i=1}^{P} X_{ti}\theta_{ijk} \right)^2 \bigg/ \sigma_k^{2,(m)} + \sum_{i=1}^{P} w_{ijk}^{(m+1)} \|\theta_{ijk}\|_2$$

given updated weights $$w_{ijk}^{(m+1)} = \frac{a_{ijk} + L}{\|\theta_{ijk}^{(m)}\|_2 + b_{ijk}}.$$

wherein $X_{ti}=(Y_{i,t-1}, \ldots, Y_{i,t-L})$
$(L_{t,k}^{(m+1)}=p(S_t=k|Y,\psi^{(m)})$ represents posterior probability of all hidden state variables,
L represents the maximum lag;
$\sigma_k$ represents the variance of random noise corresponding to the state k at time t, $S_t=k$;
m represents to m-th iteration of the iterative EM algorithm.

23. The system of claim 22, wherein the M-step further includes determining variance $\sigma_k^{2,(m+1)}$ of each Markov states wherein $$\sigma_k^{2,(m+1)} = \frac{1}{dT_k^{(m+1)}+2} \sum_{j=1}^{d} \sum_{t=1}^{T} L_{tk}^{(m+1)} \left( Y_{j,t} - \sum_{i=1}^{P} X_{ti}\theta_{ijk}^{(m+1)} \right)^2$$

where $$T_k^{(m+1)} = \sum_{t=1}^{T} L_{tk}^{(m+1)}.$$

24. The system of claim 23, wherein the M-step further includes determining the transition probability $p_{k'k}^{(m+1)}$ $$p_{k'k}^{(m+1)} = \frac{\sum_{t=1}^{T} H_{t,k'k}^{(m+1)} + \alpha_k - 1}{\sum_{t=1}^{T} L_{t,k}^{(m+1)} + \sum_{k=1}^{K} (\alpha_k - 1)}$$

wherein $(L_{t,k}^{(m+1)} = p(S_t=k|Y,\psi^{(m)})$ and $H_{t,k'k}^{(m+1)} = p(S_{t-1}=k', S_t=k|Y,\psi^{(m)})$ represent posterior probability of all hidden state variables, and $\alpha_k$ is a hyperparameter in prior distribution of transition probability $p_{k'k}^{(m+1)}$.

25. A method for change point detection in causal modeling, comprising:
receiving a multivariate time-series data;
modeling a Markov switching vector autoregressive formulation to detect structural changes in causal dependency;
solving, by a processor, for unknown parameters in the Markov switching vector autoregressive formulation, the unknown parameters including $\psi=(\theta, \sigma^2, P)$, wherein $\theta$ represents a Vector Autoregressive (VAR) coefficient, $\sigma^2$ represents variance of Markov states, and P represents a transition matrix, the solving step including performing a two-step iterative Expectation-Maximization (EM) algorithm which incorporates Bayesian hierarchical group selection until the algorithm converges, the two-step iterative EM algorithm including an E-step for imputing missing Markov state data $S_t$ through backward-forward steps and assigning Markov states to each time points, and an M-step for updating parameters $\psi$ and selecting causal effects through Bayesian hierarchical group Lasso, wherein change points in causal dependency is detected based on the parameters $\psi$.

* * * * *